BEST AVAILABLE COPY

United States Patent Office 3,557,244
Patented Jan. 19, 1971

3,557,244
PROCESS FOR THE PRODUCTION OF POLYMERS AND COPOLYMERS OF VINYL CHLORIDE HAVING A REDUCED MOLECULAR WEIGHT
Klaus Schrage, Thomasberg, Germany, assignor to Dynamit Nobel AG, Troisdorf, Bezirk Cologne, Germany, a corporation of Germany
No Drawing. Filed Jan. 3, 1969, Ser. No. 788,919
Claims priority, application Germany, Jan. 9, 1968, 1,720,529
Int. Cl. C08f 1/62
U.S. Cl. 260—78.5
9 Claims

ABSTRACT OF THE DISCLOSURE

Improved vinyl chloride polymerization process carried out in bulk with a redox catalyst in the presence of a lower alcohol and an α-hydroxy ketone.

---

This invention has to do with a method for the regulation of the molecular weight of polymers and copolymers of vinyl chloride. The tendency of vinyl chloride to polymerize below 0° C. to a product of high molecular weight is well known. These high molecular weight polymers have the disadvantage of being vary difficult to work. The working temperature that is needed is so high that the strength and color of the polymers after working leave something to be desired.

It is known that the low temperature polymerization of vinyl chloride can be performed between 0 and —60° C. with water-soluble redox systems in the presence of lower aliphatic alcohols in a quantity of from 8 to 20% by weight based upon the weight of the monomer. This results in the production of tactic polymers in yields of better than 80%, which polymers have high viscosities, i.e., high molecular weights, as, for example, $\eta_{rel}=3.80$. (See example below.)

Polymerization of this sort, in which no additional solvents, diluents or dispersing agents are used with the monomer or polymer, is referred to as mass polymerization.

It is furthermore known that these high viscosities can be reduced to the desired magnitude of $\eta_{rel}=2.0-2.5$ by the addition of regulators such as acyclic and cyclic ethers or ketones, trans-dichloroethylene, etc. At a polymerization temperature of —15° C., for example, 8 to 12 parts of tetrahydrofuran, 8 to 12 parts of acetone (see Example 2 below), or 30 to 40 parts of trans-dichloroethylene per 100 parts of vinyl chloride are necessary in order to accomplish this reduction in viscosity.

A process has now been found for the polymerization of vinyl chloride with or without comonomers by means of water-soluble redox systems as catalysts, at temperatures between 0° C. and —40° C., in the presence of lower aliphatic alcohols in a quantity of 8 to 20% of the weight of the monomer(s), whereby to form vinyl chloride homo and/or copolymers having reduced molecular weights. This process is characterized by carrying out the polymerization in the presence of 0.1 to 10%, preferably 0.2 to 3%, by weight, based upon the monomer weight, of α-hydroxyketones of the general formula:

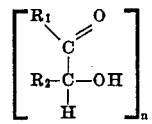

wherein n is at least equal to 1, $R_1$ represents a straight-chained or branched alkyl, cycloalkyl, cycloalkylene, aryl, aralkyl or furoyl radical, and $R_2$ represents a hydrogen atom or $R_1$. $R_1$ and $R_2$, taken together with the carbon atoms to which they are attached, may be a cycloalkylene type group having 4 to 12 carbon atoms, such as, for example, 2 hydroxy cyclohexanone, etc. The $R_1$ and $R_2$ alkylene bridge is therefore 2 to 10 carbon atoms. $R_1$ is illustrated by methyl, ethyl, 1-propyl, n-butyl, 2-ethyl hexyl, cyclobutyl, cyclohexyl, cyclohexylene, phenyl, tolyl, methyl, etc.

The polymerization and copolymerization are performed preferably at temperatures between —10° C. and —30° C. in horizontally rotating cylindrical vessels containing grinding bodies, or in vessels equipped with shear-action agitators, at conversions of at least about 30%.

The term lower aliphatic alcohols is to be understood to refer to the $C_1$ to $C_3$ alcohols, preferably methanol and ethanol.

In the mass polymerization process described, even significantly smaller amounts of α-hydroxyketones have a regulating action just as strong as that of regulators of the prior art.

The tactic polymers and copolymers that are obtained have a reduced molecular weight in comparison to polymers prepared without the addition of a regulator. The determination of the relative viscosity serves as an index of the molecular weight, e.g., a relative viscosity ($\eta_{rel}$) of 3 corresponding to a molecular weight of about 53,000 and a relative viscosity of 2 corresponding to a molecular weight of about 27,000.

The regulating action of the compounds described is not composed additively of effects of the carbonyl and carbohydroxy groups, but is specific for the structure of the α-hydroxy-carbonyl compounds. (See Examples 3 and 4 below.)

Also important is the degree of association of the α-hydroxyketones due to the formation of semi-ketals. The regulating action is strongest in the case of freshly distilled, i.e., monomeric ($n=1$) α-hydroxyketones. (See Examples 5 and 6 below.) The association occurs mostly in the case of lower aliphatic α-hydroxyketones and amounts at most to $n=100$, and generally n is less than 10.

The use of such small amounts of regulators to control molecular weight in the low temperature polymerization of vinyl chloride entails advantages in the final preparation of the product and improvements in the thermal stability of shape and in the thermal stability of the tactic polymers in comparison with regulators of the prior art.

The thermal stability of shape of the polymers is only slightly diminished according to the invention in comparison with unregulated polyvinyl chloride, whereas it is greatly diminished when alcohols, ethers or ketones are used as regulators. Thus the Vicat temperature (5 kg. of loading) for unregulated polyvinyl chloride polymerized at —15° C. ($\eta_{rel}=3.3$) amounts to 97° C. (See Example 1 below.) In the case of a polyvinyl chloride regulated with 10 parts of tetrahydrofuran per 100 parts of vinyl chloride ($\eta_{rel}=2.2$) it drops to 93° C. A polyvinyl chloride having a comparable viscosity (see Example 6 below), regulated with acetoin, has a Vicat temperature of 96° C.

Even when very greatly reduced molecular weights are achieved (see Example 5 below), there is no need to put up with such great impairments of the Vicat temperatures and thermal stabilities as in the case of regulators of the prior art. (See Examples 2 and 4 below.)

The thermal stability of the polymers prepared with the use of α-hydroxyketones is about the same as it is in the unregulated polymers prepared at the same polymerization temperatures, or it is even slightly better. (See Examples 3 and 9 below.) In comparison with the use of prior art regulators (see Examples 2 and 4 below), the improvement is great. For example, a specimen of unregulated polyvinyl chloride polymerized at −15° C., which has been calendered with 2% by weight of an organic sulfur-tin stabilizer (commercial name "17M") and 1% by weight of a montan wax, such as "OP-Wachs," as lubricant, can be exposed to a temperature of 185° C. in air for a maximum of 110 minutes without substantial discoloration. (See Example 1 below.) A product regulated with acetone and having a relative viscosity $$\eta_{rel} = 2.35$$

is blackened within less than 400 minutes (see Example 2 below); however, a polyvinyl chloride regulated with acetol, for example, and having a relative viscosity $\eta_{rel} = 2.35$, has a thermal stability of 130 minutes. (See Example 3 below.)

To prepare copolymers of vinyl chloride according to the invention, the following are used as comonomers: 0.1 to 49.9 wt. percent, preferably 0.1 to 20 wt. percent of an ethylenically unsaturated compound, such as vinyl ethers, vinyl esters such as propionate, acrylic or methacrylic acid ester, fumaric or maleic acid ester, and olefins such as ethylene, propylene, etc., and preferably vinyl acetate.

The copolymers are distinguished by reduced relative viscosities, and yet their thermal stability and thermal stability of shape are not poorer when compared with the use of prior art regulators.

The following, among other substances, can be used as redox systems: ascorbic acid, in combination with heavy metal salts, preferably of iron, nickel and cobalt, and with peroxide such as hydrogen peroxide, dilauryl peroxide, dibenzoyl peroxide, cumyl hydroperoxide, cyclohexanone peroxide, cyclohexanesulfonyl acetyl peroxide. The components of the redox system are dissolved in the aliphatic alcohols named above.

In general, the quantities of the compounds of the redox system per 100 g. of the monomer are known and can amount to between, for example, 0.8:0.8:0.4 and 0.4:0.4:0.2 (=grams of ascorbic acid:milliliters of 35 wt. percent peroxide solution:milliliters of 1 wt. percent aqueous heavy metal salt solution), it being possible also to vary the ratio of the components to one another, to 0.5:0.7:0.4, for example.

By tactic polymers of vinyl chloride are meant those having a 55% to 80% co-orientation of the chlorine atoms, measured according to Germar, Makromol. Chemie 60 (1963), pp. 106 to 119.

The tacticity of the products in the examples was measured as 68.7% for Example 3; 68.5% for Example 7; and 70.4% for Example 10.

The polymers obtained are washed with methanol, since the thermal stability of the products is impaired by residues of the regulators.

The following examples are illustrative of the instant invention without being limiting thereon.

EXAMPLE 1 (STANDARD OF COMPARISON—PRIOR ART)

An autoclave of corrosion-resistant steel having a capacity of 2 liters was used which contained 7 35 mm. diameter balls of V2A (stainless) steel and was provided with a polyamide rod mounted along its central axis. 500 g. of vinyl chloride, 55 g. of methanol and, as catalysts, 3 g. of ascorbic acid, 3 ml. of 35 wt. percent $H_2O_2$ solution and 1.5 ml. of 1 wt. percent $Fe_2(SO_4)_3$ solution were placed in the autoclave and maintained at −15° C. by means of a cooling bath. The autoclave was rotated at 50 r.p.m. for 21 hours. The polymerization yield was 77%; the relative viscosity of a 1 wt. percent solution of the product (measured in cyclohexanone at 20° C.) was 3.80; the thermal stability of shape according to Vicat (5 kg. load) was 97° C.; and the thermal stability of a methanol-washed specimen that had been mixed in a roller mixer with 2% 17M stabilizer and 1% "OP Wachs" lubricant was 110 minutes at 185° C. in air.

EXAMPLE 2 (STANDARD OF COMPARISON—PRIOR ART)

The polymerization was performed under the conditions stated for Example 1, with the addition of 40 g. of acetone. The yield after 21 hours was 88%; the relative viscosity of the product was 2.35; the thermal stability of shape according to Vicat was 89° C.; and the thermal stability of a methanol-washed specimen that had been kneaded in a roller mixer with 2% 17M stabilizer and 1% "OP Wachs" lubricant was less than 40 minutes at 185° C. in air.

EXAMPLE 3

The polymerization was performed under the conditions stated for Example 1, with the addition of 40 g. of undistilled 1-hydroxypropanone (acetol). The yield amounted, after 21 hours, to 67%; the relative viscosity of the product was 2.35; the thermal stability of shape according to Vicat was 96° C.; and the thermal stability of methanol-washed specimen that had been kneaded in a roller mixer with 2% 17M stabilizer and 1% "OP Wachs" lubricant was 130 minutes in air at 185° C.

EXAMPLE 4 (STANDARD OF COMPARISON—PRIOR ART)

The polymerization was performed under the conditions stated in Example 1, with the addition of 10 g. of acetone and 10 g. of propanol-(1). The yield after 21 hours was 93%; the relative viscosity of the product was 3.05; the thermal stability of shape according to Vicat was 92° C.; and the thermal stability of a methanol-washed specimen that had been kneaded in a roller mixer with 2% 17M stabilizer and 1% "OP-Wachs" lubricant was 50 minutes in air at 185° C.

EXAMPLE 5

The polymerization was performed under the conditions stated in Example 1, with the addition of 10 g. of freshly distilled 3-hydroxybutanone-(2) (acetoin, melting point 15° C.). The yield after 8 hours was 25%; the relative viscosity of the product was 2.0; the thermal stability of shape according ot Vicat was 94° C.; and the thermal stability of a methanol-washed specimen prepared on a roller mixer with 2% 17M stabilizer and 1% "OP-Wachs" lubricant was 80 minutes in air at 185° C.

EXAMPLE 6

The polymerization was performed under the conditions stated in Example 5, but with 10 g. of polymeric acetoin (melting point 60–65° C.). The polymerization yield after 8 hours was 33%; the relative viscosity of the product was 2.25; the thermal stability of shape according to Vicat was 96° C.; and the thermal stability of a methanol-washed specimen that had been kneaded with 2% 17M stabilizer and 1% "OP-Wachs" lubricant on a roller mixer was 100 minutes in air at 185° C.

EXAMPLE 7

The polymerization was performed under the conditions stated in Example 1, with the addition of 15 g. of freshly distilled 4-hydroxyhexanone-3 (propioin). The yield after 21 hours was 70%; the relative viscosity was 2.05; the thermal stability of shape according to Vicat was 96° C.; and the thermal stability of a methanol-washed specimen kneaded with 2% 17M stabilizer and 1% "OP-Wachs" lubricant on a roller mixer was 100 minutes in air at 185° C.

EXAMPLE 8

The polymerization was performed under the conditions stated in Example 1, with the addition of 15 g. of 1,4-diphenyl-3-hydroxybutanone-(2). The yield after 21 hours was 55%; the relative viscosity of the product was 2.25; the thermal stability of shape according to Vicat was 96° C.; and the thermal stability of a methanol-washed specimen which had been kneaded in a roller mixer with 2% 17M stabilizer and 1% "OP-Wachs" lubricant was 90 minutes in air at 185° C.

EXAMPLE 9

The polymerization was performed under the condition stated in Example 1, with the addition of 10 g. of freshly distilled 5-hydroxyoctanone-(4) (butyroin). The yield after 21 hours was 57%; the relative viscosity of the product was 2.35; the thermal stability of shape according to Vicat was 95° C., and the thermal stability of a methanol-washed specimen that had been kneaded in a roller mixer with 2% 17M stabilizer and 1% "OP-Wachs" lubricant was 120 minutes in air at 185° C.

EXAMPLE 10

The polymerization was performed under the conditions stated in Example 1, with the addition of 15 g. of freshly distilled butyroin, but at −25° C. The polymerization yield after 21 hours was 30%; the relative viscosity of the product was 2.50; the thermal stability of shape according to Vicat was 98° C.; the thermal stability of a methanol-washed specimen kneaded with 2% 17M stabilizer and 1% "OP-Wachs" lubricant in a roller mixer was 150 minutes in air at 185° C.

When 70 g. of methanol in one case and 80 g. of ethanol in another, instead of 55 g. of methanol, the above results were likewise obtained.

EXAMPLE 11

The polymerization was performed under the conditions stated in Example 1, with the addition of 6 g. of freshly distilled 2-hydroxycyclohexanone (adipoin). The yield after 21 hours was 51%, the relative viscosity of the product aws 2.50; the thermal stability of shape according to Vicat was 96° C., and the thermal stability of a methanol-washed specimen kneaded with 2% 17M stabilizer and 1% "OP-Wachs" lubricant was 110 minutes in air at 185° C.

EXAMPLE 12

The polymerization was performed under the conditions stated in Example 1, with the addition of 1 g. of furoyl furyl carbinol of the formula

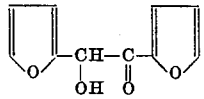

(furoin), but with 13 parts of methanol per 100 parts of vinyl chloride. The polymerization yield after 21 hours was 65%; the relative viscosity of the product was 2.35; the Vicat stability of shape was 92° C.; and the thermal stability of a methanol-washed specimen that had been kneaded in a roller mixer with 2% 17M stabilizer and 1% "OP-Wachs" lubricant was 50 minutes in air at 185° C.

EXAMPLE 13 (STANDARD OF COMPARISON)

Under the conditions stated in Example 1, 450 g. of vinyl chloride was copolymerized with 50 g. of vinyl acetate. The polymerization yield after 21 hours was 73%; the relative viscosity of the copolymer was 3.0; the thermal stability of shape according to Vicat was 85° C.; and the thermal stability of a methanol-washed specimen kneaded in a roller mixer with 2% 17M stabilizer and 1% "OP-Wachs" lubricant was less than 40 minutes in air at 185° C.

EXAMPLE 14

Under the conditions stated in Example 1, 450 g. of vinyl chloride was copolymerized with 50 g. of vinyl acetate with the addition of 5 g. of acetol. The polymerization yield after 21 hours was 55%; the relative viscosity was 2.50; the Vicat stability of shape was 87° C.; and the thermal stability of a methanol-washed specimen that had been kneaded in a roller mixer with 2% 17M stabilizer and 1% "OP-Wachs" lubricant was 60 minutes in air at 185° C.

EXAMPLE 15 (STANDARD OF COMPARISON—PRIOR ART)

Under the conditions stated in Example 1, but using an equivalent quantity of a cobalt sulfate solution instead of the iron sulfate solution, results much the same as in Example 1 were obtained.

EXAMPLE 16 (STANDARD OF COMPARISON—PRIOR ART)

Under the same conditions as Example 1, when 3.6 g. of ascorbic acid, 4 ml. of 35% $H_2O_2$ solution and 1.5 ml. of 1 wt. percent iron sulfate solution were used as catalyst, and 50 g. of ethanol was used instead of the methanol, results corresponding to Example 1 were obtained at a polymerization temperature of −18° C.

In all of the examples, the polymers are in powder form, free of agglomerate.

The determined relative viscosities given in the examples correspond to the following average molecular weights:

Example 1: Approx. 60,000
Example 2: 41–43,000
Example 3: 41–43,000
Example 4: 51–55,000
Example 5: 26–28,000
Example 6: 39–41,000
Example 7: 29–31,000
Example 8: 39–41,000
Example 9: 41–43,000
Example 10: 46–48,000
Example 11: 46–48,000
Example 12: 41–43,000

The term "OP-wachs" is a trade designation for estermontanic acids with 18 to 36 C. atoms in the acid component which is a commercially available material.

What is claimed is:

1. In the process of bulk polymerizing vinyl chloride at temperatures of about 0° C. to −40° C. in the presence of a water-soluble redox system catalyst and in the presence of about 8 to 20 weight percent, based upon monomer weight, of at least one lower aliphatic alcohol; the improvement which comprises carrying out the polymerization in the further presence of about 0.1 to 10 weight percent, based upon monomer weight, of at least one α-hydroxy ketone of the formula

wherein $n$ is at least equal to 1; $R_1$ is a member selected from the group consisting of alkyl, cycloalkyl, cycloalkylene, aryl, aralkyl and furoyl; $R_2$ is a member selected from the group consisting of $R_1$ and hydrogen; and $R_1$ and $R_2$, taken together with the carbon atoms to which they are attached, are a cycloalkylene group of 4 to 12 carbon atoms.

2. Process claimed in claim 1, wherein said α-hydroxy ketone is present in proportion of about 0.2 to 3 weight percent.

3. Process claimed in claim 1, carried out at about −10° to −30° C.

4. Process claimed in claim 1, wherein said polymerization is carried out to a conversion of at least 30%.

5. Process claimed in claim 1, wherein said polymer is a vinyl chloride homopolymer.

6. Process claimed in claim 1, wherein said α-hydroxy ketone is at least one member selected from the group consisting of acetol, acetoin, polyacetoin, propioin, 1,4-diphenyl-3-hydroxy-butanone-2, butyroin, adipoin, and furoin.

7. Process claimed in claim 1, wherein said polymer is a copolymer of vinyl chloride with about 0.1 to 49.9 weight percent of at least one comonomer selected from the group consisting of vinyl ethers, vinyl esters, acrylate esters, methacrylate esters, fumaric esters, maleic esters, and α-olefins.

8. Process claimed in claim 1, wherein said polymer is a copolymer of vinyl acetate and vinyl chloride.

9. Process claimed in claim 1 clarried out in the additional presence of at least one member of the group consisting of ketones and ethers.

References Cited

FOREIGN PATENTS 1,062,385  3/1967  Great Britain _____ 260—92.8

JOSEPH L. SCHOFER, Primary Examiner

S. M. LEVIN, Assistant Examiner

U.S. Cl. X.R.

260—28.5, 45.75, 86.3, 87.1, 87.5, 92.8